US 011815718B2

(12) United States Patent
Puckett et al.

(10) Patent No.: US 11,815,718 B2
(45) Date of Patent: Nov. 14, 2023

(54) INTEGRATED PHOTONICS VERTICAL COUPLER BASED ON SUBWAVELENGTH GRATING

(71) Applicant: Honeywell International Inc., Charlotte, NC (US)

(72) Inventors: Matthew Wade Puckett, Phoenix, AZ (US); Chad Fertig, Bloomington, MN (US); Steven Tin, Edina, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/531,441

(22) Filed: Nov. 19, 2021

(65) Prior Publication Data

US 2022/0229227 A1    Jul. 21, 2022

Related U.S. Application Data

(60) Provisional application No. 63/140,156, filed on Jan. 21, 2021.

(51) Int. Cl.
*G02B 6/124* (2006.01)
*G02B 6/14* (2006.01)
(Continued)

(52) U.S. Cl.
CPC ......... *G02B 6/124* (2013.01); *G02B 6/12002* (2013.01); *G02B 6/14* (2013.01); *G02B 6/34* (2013.01)

(58) Field of Classification Search
CPC . G02B 6/124; G02B 6/14; G02B 6/34; G02B 6/12002; G02B 6/126;
(Continued)

(56) References Cited

U.S. PATENT DOCUMENTS 8,750,654 B2   6/2014   Dupuis et al.
9,632,248 B2   4/2017   Selvaraja
(Continued)

FOREIGN PATENT DOCUMENTS

CA    2734614 A1     9/2009
WO    2020169357 A1  8/2020

OTHER PUBLICATIONS

Bock et al., "Subwavelength grating crossings for silicon wire waveguides", Optics Express 16146, Jul. 15, 2010, pp. 1 through 10, vol. 18, No. 15, Optical Society of America.
(Continued)

*Primary Examiner* — Michael P Mooney
(74) *Attorney, Agent, or Firm* — Fogg & Powers LLC

(57) ABSTRACT

Techniques relating to an improved optical waveguide are described. The optical waveguide includes an upper and lower waveguide that each comprise a first and second layer, in which photons are transferred from the lower waveguide to the upper waveguide. A structured subwavelength coupling region is included, for example, in the first upper waveguide layer. The fill factor of the subwavelength grating coupling region is increased in the direction of light propagation to increase the index of refraction of the structured subwavelength coupling region and therefore improve photon transfer from the lower waveguide. Additionally, the width of the optical waveguide (at least along the structured subwavelength coupling region) remains constant as the fill factor increases.

20 Claims, 8 Drawing Sheets

(51) Int. Cl.
*G02B 6/34* (2006.01)
*G02B 6/12* (2006.01)

(58) Field of Classification Search
CPC .......... G02B 2006/12107; G02B 2006/12147; H04B 10/11; H04B 10/801
See application file for complete search history.

(56) References Cited

U.S. PATENT DOCUMENTS

| | | | |
|---|---|---|---|
| 2005/0259923 A1 | 11/2005 | Sriram et al. | |
| 2007/0058900 A1 | 3/2007 | Faccio et al. | |
| 2008/0193079 A1 | 8/2008 | Cheben et al. | |
| 2008/0316485 A1 | 12/2008 | Wawro et al. | |
| 2012/0039567 A1* | 2/2012 | Herman | G02B 6/34 385/37 |
| 2014/0153862 A1* | 6/2014 | Picard | G02B 6/126 385/11 |
| 2014/0314374 A1 | 10/2014 | Fattal et al. | |
| 2017/0205578 A1* | 7/2017 | Van Thourhout | G02B 6/2726 |
| 2017/0254954 A1* | 9/2017 | Liu | G02B 6/30 |

OTHER PUBLICATIONS

Puckett, Matthew W. et al., "Integrated Photonics Vertical Coupler", U.S. Appl. No. 16/803,831, filed Feb. 27, 2020, pp. 1 through 31, Published: US.

Sarmiento-Merenguel et al., "Controlling leakage losses in subwavelength grating silicon metamaterial waveguides", Optics Letters, Aug. 1, 2016, pp. 3443 through 3446, vol. 41, No. 15, Optical Society of America.

Xiong et al., "High Extinction Ratio and Broadband Silicon TE-Pass Polarizer Using Subwavelength Grating Index Engineering", IEEE Photonics Journal, Oct. 2015, pp. 1 through 8, vol. 7, No. 5, IEEE.

European Patent Office, "Extended European Search Report from EP Application No. 21209608.5", from Foreign Counterpart to U.S. Appl. No. 17/531,441, dated May 11, 2022, pp. 1 through 8, Published: EP.

Liang, et al., "Efficient Active-to-Passive Light Coupling of InGaAsP/InP Laser Using Subwavelength Coupler", IEEE Photonics Journal, IEEE, USA, vol. 5, No. 6, Dec. 1, 2013, pp. 6602408 (1 through 9).

Xie, et al., "Ultra-Compact Subwavelength-Grating-Assisted Polarization-Independent Directional Coupler", IEEE Photonics Technology Letters, IEEE, USA, vol. 31, No. 18, Sep. 15, 2019, pp. 1538 through 1541.

* cited by examiner

Longitudinal Fill Factor Gradient width

Transverse Duty Cycle Gradient

T

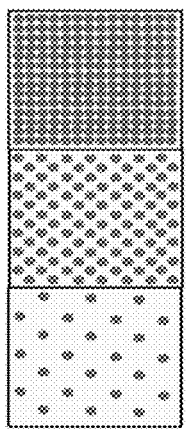
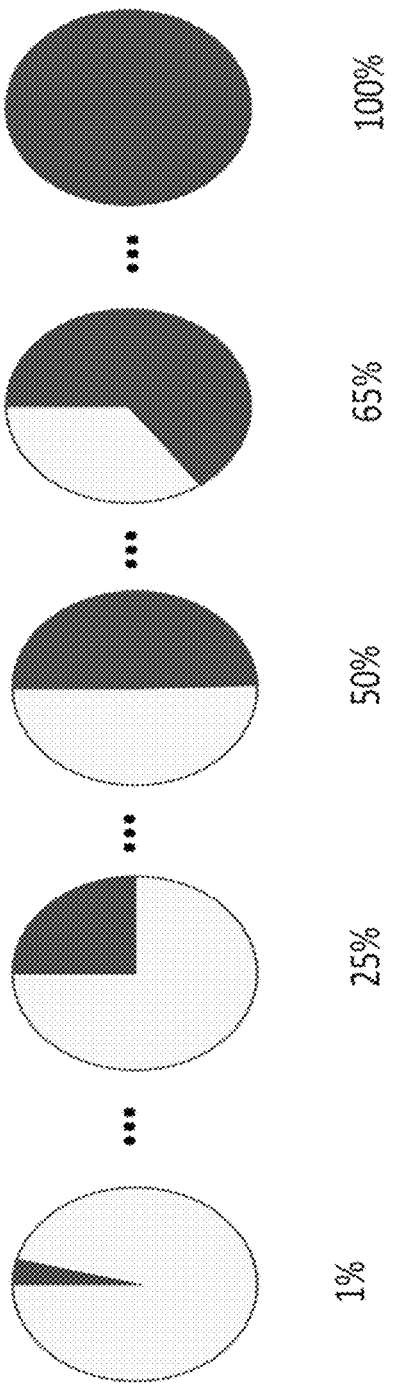
FIG. 3C
FIG. 3D

INTEGRATED PHOTONICS VERTICAL COUPLER BASED ON SUBWAVELENGTH GRATING

STATEMENT REGARDING FEDERALLY SPONSORED RESEARCH OR DEVELOPMENT

This invention was made with Government support. The Government has certain rights in the invention.

BACKGROUND

In integrated photonics applications, oftentimes light is coupled between two vertically separated waveguide layers. For example, in some integrated photonics devices, light is coupled between a lower waveguide layer (also referred herein as a "substrate layer" or "substrate") and an upper waveguide layer to transfer photons from the lower waveguide layer to the upper waveguide layer. The lower waveguide layer can produce entangled photons, which are then transferred to the upper waveguide layer. The upper waveguide layer then transmits the photons elsewhere for further processing. Such devices can be useful for precision time transfer or as part of quantum key distribution systems.

Photons generated from an integrated photonics entangled photon source may occupy a transverse electric (TE) or a transverse magnetic (TM) polarization state. When the photons are transferred to the upper waveguide layer, the photons may undergo a polarization state change, such as from a TE-mode to a TM-mode polarization state. Maintaining the coupling efficiency between TE-mode and TM-mode polarized light is useful to improving device performance.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, an optical waveguide is provided. The optical waveguide comprises a lower waveguide, which comprises a first lower waveguide layer and a second lower waveguide layer coupled to the first lower waveguide layer. The second lower waveguide layer is configured to receive photons from an optical signal. The optical waveguide further comprises an upper waveguide, which comprises a first upper waveguide layer configured to receive the photons from the second lower waveguide layer, and a second upper waveguide layer coupled to the first upper waveguide layer. The first upper waveguide layer includes a subwavelength structured coupling region having a fill factor that increases in a direction of light propagation. The width of the subwavelength structured coupling region remains constant in the direction of light propagation.

In another embodiment, an optical system is provided. The optical system comprises a signal source, in which the signal source is configured to transmit an optical signal. The optical system further comprises a first photonics circuit coupled to the signal source, which is configured to receive the optical signal. The optical system further comprises an optical waveguide coupled to the first photonics circuit. The optical waveguide comprises a lower waveguide including a first lower waveguide layer and a second lower waveguide layer coupled to the first lower waveguide layer. The second lower waveguide layer is configured to receive photons from the optical signal. The optical waveguide further comprises an upper waveguide, including a first upper waveguide layer configured to receive the photons from the second lower waveguide layer, and a second upper waveguide layer coupled to the first upper waveguide layer. The optical system further comprises signal emission optics coupled to the optical waveguide configured to transmit the photons outward from the optical system. The first upper waveguide layer includes a subwavelength structured coupling region having a fill factor that increases in a direction of light propagation, and a width of the subwavelength structured coupling region remains constant in the direction of light propagation.

In yet another embodiment, a method for manufacturing an optical waveguide is provided. The method comprises forming a first lower waveguide layer and placing a second lower waveguide layer on the first lower waveguide layer. The second lower waveguide layer is configured to receive photons from an optical signal. The method further comprises placing a first upper waveguide layer on the second lower waveguide layer, in which the first upper waveguide layer is configured to receive the photons from the second lower waveguide layer. The method further comprises placing a second upper waveguide layer on the first upper waveguide layer. The first upper waveguide layer includes a subwavelength structured coupling region having a fill factor that increases in a direction of light propagation. Additionally, a width of the subwavelength structured coupling region remains constant in the direction of light propagation.

In the description that follows, the terms "about" or "substantially" mean that the value or parameter specified may be somewhat altered, as long as the alteration does not result in nonconformance of the process or structure to the illustrated embodiment from the perspective of one having ordinary skill in the art. For instance, unless otherwise indicated, a numerical quantity modified by the term "substantially" can be altered to within ±20% of the specified value. The term "relatively" indicates a value higher or lower than a specified reference. Finally, the term "exemplary" merely indicates the accompanying description is used as an example, rather than implying an ideal, essential, or preferable feature of the invention.

BRIEF DESCRIPTION OF THE DRAWINGS

Exemplary features of the present disclosure, its nature and various advantages will be apparent from the accompanying drawings and the following detailed description of various embodiments. Non-limiting and non-exhaustive embodiments are described with reference to the accompanying drawings, wherein like labels or reference numbers refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIG. 3C is a top-view diagram of a stippled pillars fill factor gradient as described in an embodiment;

FIG. 3D is an illustration of the fill factor at various points of a coupling region as described in one or more embodiments;

Figure 1:
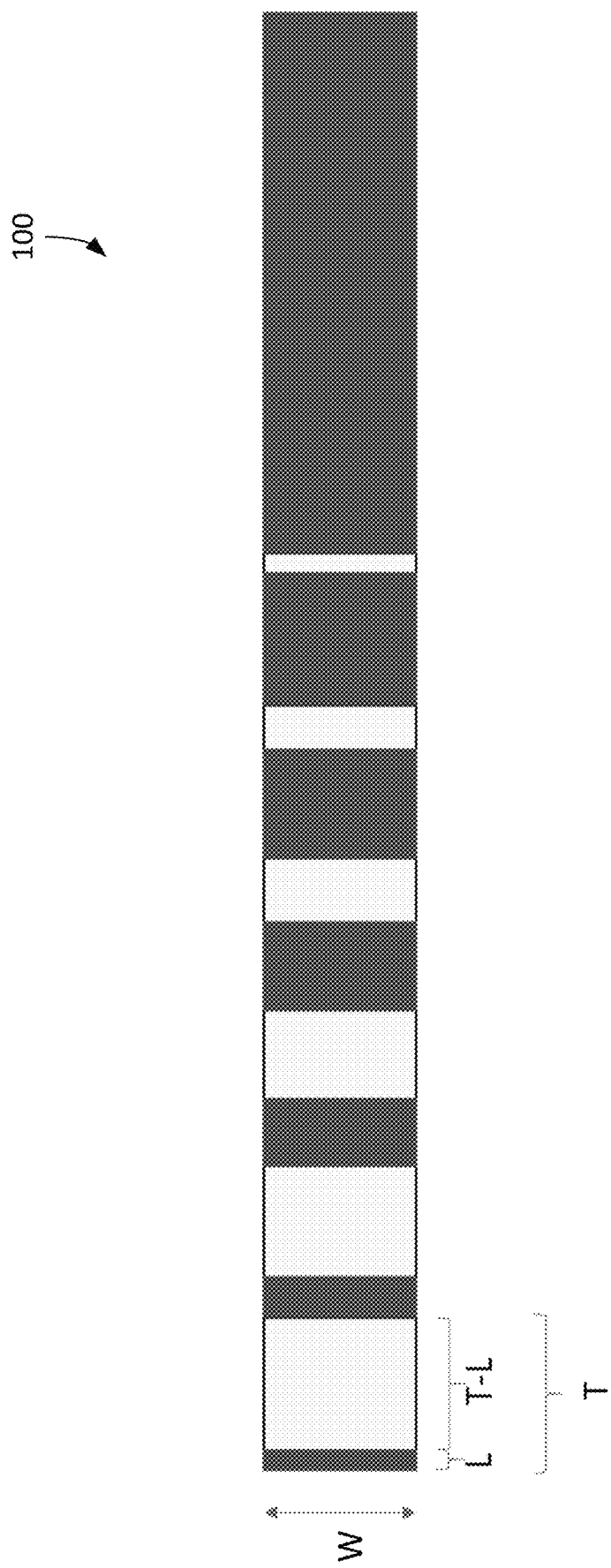
FIG. 1 is a top-view diagram of a coupling region of an optical waveguide as described in one or more embodiments.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

One problem relevant (though not necessarily exclusive) to integrated photonics involves the loss of photons as they are transferred between different materials. The refractive properties of materials, for example, can be used to guide light towards a particular material. However, some light may inevitably be lost during the transfer, thereby reducing the accuracy and efficiency of optical systems utilizing light signals in various applications.

As increasing the refractive index of materials can improve light transfer, one technique to increase the refractive index of photonics waveguides is to increase the width of the waveguide. While doing so achieves the desired technical effect, it does so at the cost of unavoidable signal leakage during transitions between TE to TE polarized modes. Specifically, some of the TE-polarized light can convert to TM-polarized light along the transition and leak out from the substrate instead of transferring to the optical waveguide. This leakage affects TE-polarized mode transitions greater than TM polarized mode transitions, which often results in an unequal coupling efficiency between the two modes. It further reduces the efficiency of the light that is transferred between the substrate and optical waveguide layers. Improving the light transfer between the two layers can thus ultimately improve the efficiency of the integrated photonics system and produce more reliable data.

The embodiments below address these problems through an improved optical waveguide, in which the waveguide includes a subwavelength structured coupling region on the optical waveguide. The subwavelength structured coupling region includes a series of chirped grating elements. From one end of the waveguide to the other, the fill factor of the subwavelength structured coupling region is gradually increased for example, by increasing the length of the grating elements, thus enabling increased light transfer between different waveguide layers. In addition, the width of the grating elements (and thus the waveguide) in the subwavelength structured coupling region also remains constant over the length of the waveguide; or in other words, the fill factor of the subwavelength structured coupling region is increased without change to the width of the waveguide. Such embodiments can be desirable in various integrated photonics and integrated optics applications, as will be apparent from the description below.

By increasing the fill factor of the subwavelength structured coupling region disposed on the optical waveguide without tapering the waveguide width, light can be more efficiently transferred between the optical waveguide layers with reduced leakage. Not only does this increase the coupling efficiency between the TE-polarized modes in the lower and upper waveguide, but it also improves the overall efficiency of the waveguide and any parent systems utilizing the waveguide, for example, by requiring less intensity output from a photon source used to pump light to the waveguide.

FIG. 1 illustrates a top-view perspective of an exemplary subwavelength structured coupling region ("coupling region") of an optical waveguide with a subwavelength grating layer 100 disposed in the coupling region. The coupling region may comprise other waveguide layers as well, which for purposes of illustrating the structure of subwavelength grating layer 100 are not shown in FIG. 1 but instead described in further detail below. The optical waveguide can be a nanowire waveguide. In the embodiment shown in FIG. 1, light travels from the left end of subwavelength grating layer 100 to the right end, which, as described in FIG. 2 below, transfers light from the lower waveguide layers to the upper waveguide layers.

Subwavelength grating layer 100 includes a plurality of subwavelength segments formed on the optical waveguide. Each subwavelength segment occupies a length T across subwavelength grating layer 100. Each subwavelength segment includes a grating segment having a length L as well as a spacing segment having a length T−L (which may be zero, in which case the grating segment occupies the entire length L of the respective subwavelength segment). Each subwavelength segment also has a width W.

As shown in FIG. 1, the length L of each of the grating segments gradually increases from the left to the right side of subwavelength grating layer 100, which consequently decreases the spacing T−L for each spacing segment for a constant length T. Thus, by increasing the length L of each grating segment, the fill factor of the subwavelength grating layer increases as photons propagate through the optical waveguide. As used herein, "fill factor" means the ratio of the distribution of the grating segments over the total distribution of each subwavelength segment. For example, in FIG. 1, the fill factor would be the ratio of the length L of the grating segments over the total length T of each subwavelength segment. By increasing the fill factor of subwavelength grating layer 100, the index of refraction of the optical waveguide also increases, thus enabling increased light transfer from a lower waveguide into the upper waveguide layer. As shown in FIG. 1, the fill factor is increased along the direction of light propagation.

In addition, while the fill factor of subwavelength grating layer 100 increases, the width W of each subwavelength segment (and indeed throughout the entirety of subwavelength grating layer 100) also remains constant throughout the total length of the coupling region of the optical waveguide. This is different from conventional waveguides, which increase the width of the optical waveguide in order to transfer light to the upper waveguide layers. Consequently, waveguides including subwavelength grating layer 100 can transfer light with reduced residual TM-polarized light loss as a result of TE-polarized mode transition. Thus, subwavelength grating layer 100 facilitates improved light transfer through the coupling region of an optical waveguide while also reducing the effects of TM-polarized light loss. This advantage in turn improves the coupling efficiency between the TM and TE modes, which may improve the performance of photonics devices.

Figure 2:
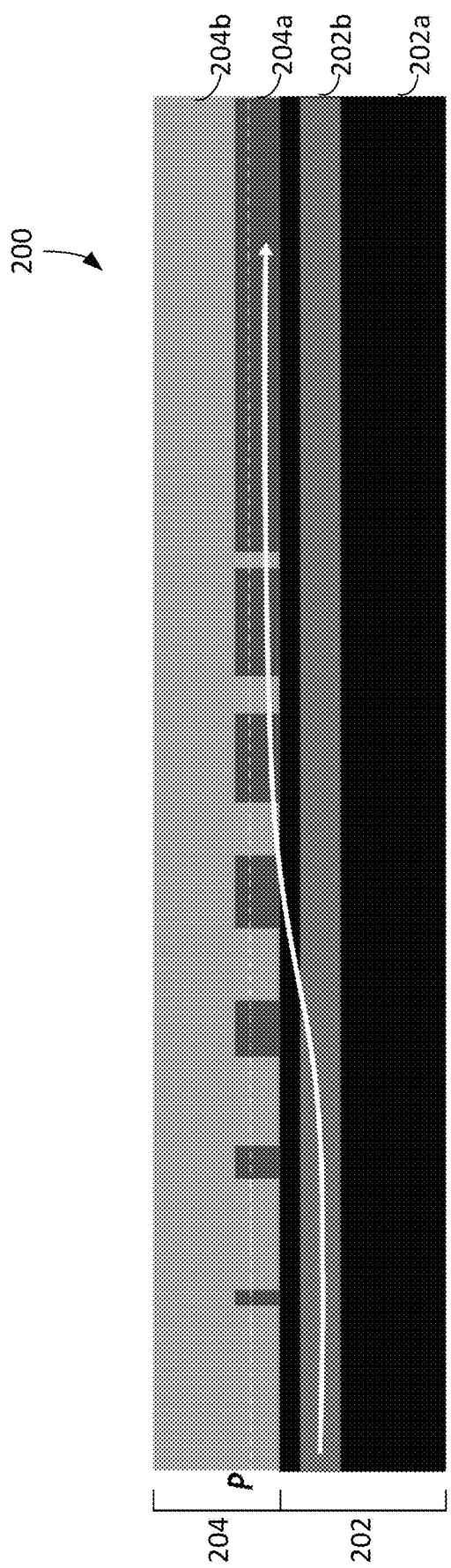
FIG. 2 is a side-view diagram of a coupling region of an optical waveguide as described in one or more embodiments.

FIG. 2 illustrates a side-view of a cross-section of an exemplary coupling region 200 through a plane P for facilitating light transfer in an optical waveguide. Coupling region 200 comprises two waveguides. A first (lower) waveguide 202 forms the bottom portion of coupling region 200, while a second (upper) waveguide 204 is disposed on top of lower waveguide 202. Additionally, each waveguide comprises a core and cladding layer. For instance, lower waveguide 202 comprises a cladding layer 202a and a core layer 202b, and upper waveguide 204 comprises a core layer 204a and a cladding layer 204b. In some embodiments, cladding layers 202a and 204b comprise a low index of refraction material relative to respective core layers 202b and 204a. For example, cladding layer 202a may comprise a lower index of refraction material than core layer 202b. To facilitate efficient light transfer between lower waveguide layer 202 and upper waveguide layer 204, core layer 202b in some embodiments comprises a lower index of refraction material than core layer 204a.

Referring to upper waveguide 204, core layer 204a includes a subwavelength grating layer with a plurality of subwavelength segments as described above. The fill factor of the subwavelength grating layer increases from the left side of coupling region 200 to the right side as the individual grating segments get longer. As light propagates through core layer 202b of lower waveguide 202 (indicated by the white arrow), the increasing fill factor of core layer 204a causes the light to be pulled up from core layer 202b to core layer 204a throughout coupling region 200.

Figure 3A:
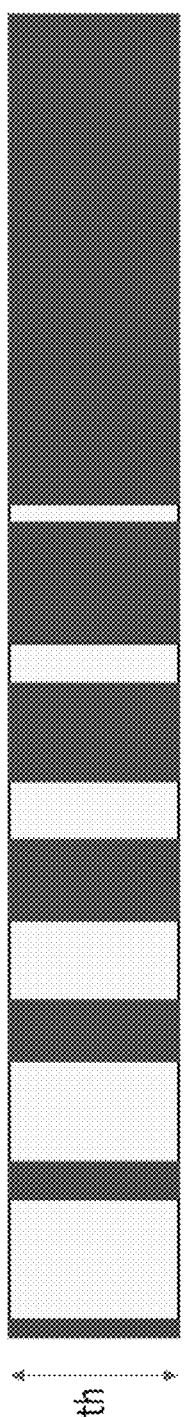
FIG. 3A is a top-view diagram of a longitudinal fill factor gradient as described in an embodiment.
Figure 3B:
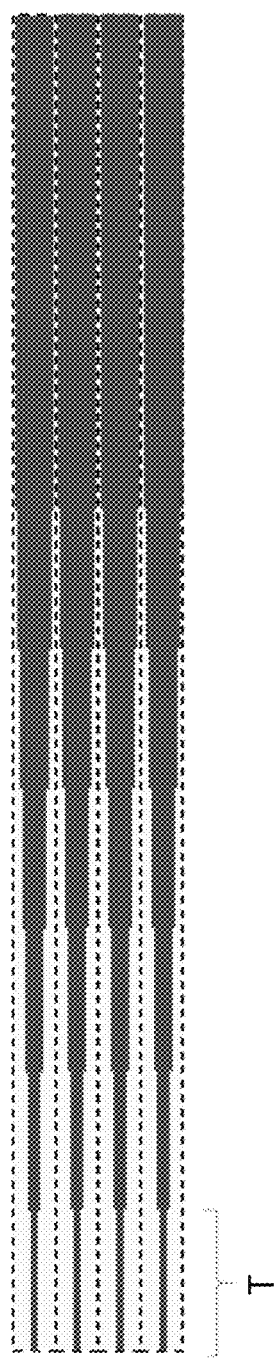
FIG. 3B is a top-view diagram of a transverse duty cycle fill factor gradient as described in an embodiment.

While the fill factor of the subwavelength grating layer disposed on the upper waveguide can be achieved via the embodiments described with respect to FIGS. 1-2, the fill factor may be increased through other techniques as well. FIGS. 3A-3C, for example, illustrates various other ways in which the fill factor of the subwavelength grating layer can be increased. Specifically, FIGS. 3A-3C illustrate top-views of three subwavelength grating designs that may be implemented. For illustrative purposes, assume light propagates from the left to right direction in each of the fill factor gradients.

One technique of increasing the fill factor is to implement a longitudinal fill factor gradient, which is shown in FIG. 3A and described above with respect to FIGS. 1-2. An alternative technique is to impose a transverse duty cycle gradient in FIG. 3B. In this case, the length T of the grating segments is uniformly constant per each subwavelength segment. Here, however, the width (e.g., thickness) of each grating segment (shown in black) gradually increases as light propagates from left to right. Thus, for each successive subwavelength segment, the grating segment occupies a greater spatial area than the spacing segment (shown in white), which thereby increases the fill factor of the subwavelength grating layer. In this case, then, the fill factor would be the ratio of the spatial area distribution of the grating elements in each subwavelength segment over the total spatial area of each subwavelength segment.

FIG. 3C describes yet another technique to increase the fill factor of the subwavelength grating layer, referred to as a stippled pillars gradient. For each subwavelength segment 302, a number of grating "pillars" permeate the area. As shown in FIG. 3C, the grating pillars may be distributed evenly through each subwavelength segment; however, the grating pillars may be dispersed through other patterns or gradients as well. Each consecutive subwavelength segment on the right includes a greater spatial area of grating pillars than a segment on the left side; the increase of grating pillars over a given segment spatial area thereby increases the fill factor in the direction of light propagation. Although FIG. 3 depicts some exemplary techniques to increase the fill factor of the subwavelength segments in the subwavelength grating layer, various other techniques can also be used.

FIG. 3D illustrates a graphical representation (represented as a pie chart) of the fill factor of the subwavelength segments at various points along the subwavelength grating layer. FIG. 3D can apply to any of the fill factor gradient embodiments discussed. For example, at the first subwavelength segment, the fill factor of the subwavelength grating layer is 1%. At some number of subwavelength segments later, the fill factor increases to 25%, then to 50%, and then to 65%. In some embodiments, the fill factor increases to 100% or substantially 100% at the opposing end of the subwavelength grating layer. The fill factor can increase via a number of different rates. The fill factor can, for instance, increase linearly as a function of the coupling region length, but can also increase more or less rapidly (e.g., exponentially).

Figure 4:
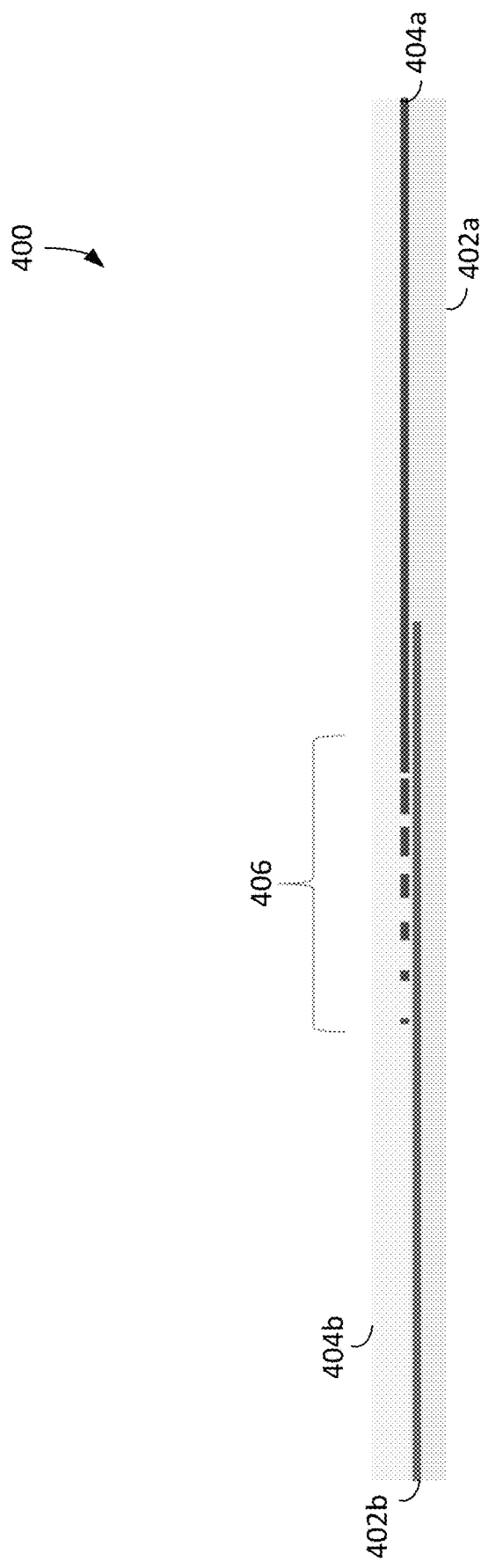
FIG. 4 is a side-view diagram of an optical waveguide as described in one or more embodiments.

The subwavelength grating layer described in FIGS. 1-3 is disposed on an optical waveguide, of which one example is illustrated in FIG. 4. Referring to FIG. 4, optical waveguide 400 includes a lower waveguide layer that comprises a cladding layer 402a and a core layer 402b. In some embodiments, cladding layer 402a is composed of a low index of refraction material and core layer 402b is composed of a material having a higher index of refraction material than cladding layer 402a. Additionally, optical waveguide 400 includes an upper waveguide layer separated into a core layer 404a and a cladding layer 404b. In some embodiments, the core layer 404a is composed of a high index of refraction material and cladding layer 404b is composed of a material having a lower index of refraction than core layer 404a. Optical waveguide 400 also includes coupling region 406 where a subwavelength grating layer is disposed in core layer 404a of the upper waveguide layer.

Optical waveguide 400 receives photons from a signal source transmitted through a signal path, for example, a fiber optic cable or other optical medium. The photons enter the lower waveguide through core layer 402b, which may occupy either or both TE or TM modes. Due to the gradient in effective mode index of the upper waveguide, specifically in coupling region 406, the photons are transferred from the lower waveguide to the upper waveguide, specifically, from core layer 402b to core layer 404a. During this process, the photons may undergo a conversion from one polarized state to the other (e.g., from a TM-mode to a TE-mode and vise-versa). The photons are then transmitted out of upper waveguide of optical waveguide 400 via an output on one or both ends of the waveguide.

Figure 5:
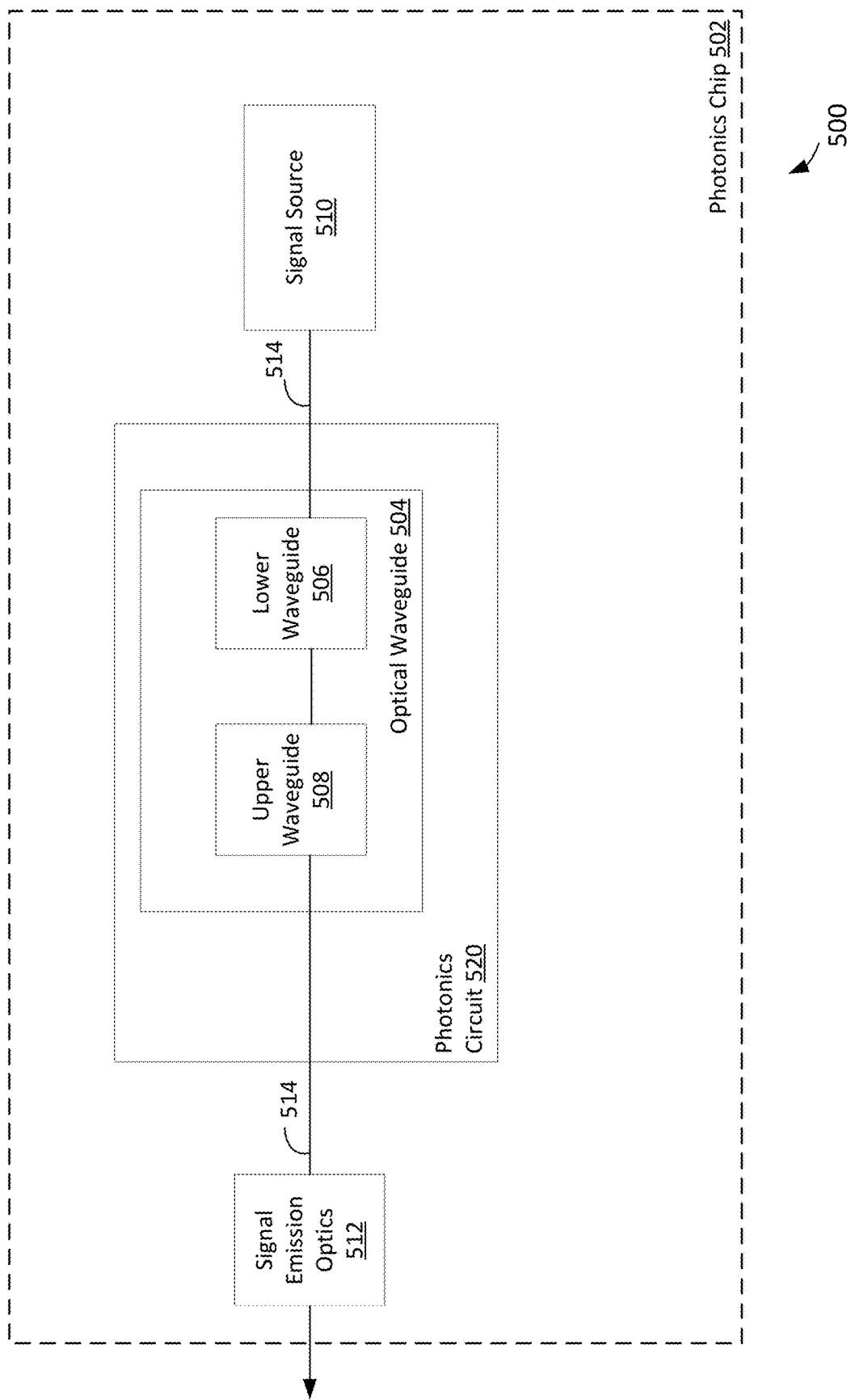
FIG. 5 is a block diagram of a system including a photonics circuit with an optical waveguide as described in one or more embodiments.

FIG. 5 illustrates a block diagram of a system 500 configured to propagate light from a signal source 510 of an example embodiment. System 500 may be implemented on a photonics chip 502. System 500 further includes signal source 510, one or more photonics circuits 520, and signal emission optics 512, which can be coupled by coupling waveguides 514 or free space optics.

Signal source 510 can include a signal generating device such as a laser, which is configured to transmit light through coupling waveguide 514 that is received by photonics circuit 520. Photonics circuit 520 then transfers the light to optical waveguide 504, which comprises both a lower waveguide 506 and an upper waveguide 508. Lower waveguide 506 receives the light, and via the subwavelength structured coupling region in upper waveguide 508, transfers the light into upper waveguide 508, where it is output back to photonics circuit 520. In some embodiments, the light is output to a second photonics circuit 520, which may execute other optical functions, such as spectral filtering or mode conversion.

The output light is be transmitted through coupling waveguide 514 to signal emission optics 512. Signal emission optics 512 is configured to transmit the light out of system 500. In some embodiments, signal emission optics 512 transmits the light into free space to be received by another detector e.g., a satellite or a photonics system located remotely from signal emission optics 512. In some embodiments, signal emission optics 512 can include one or more lenses (e.g, ball lenses, gradient index (GRIN) lenses, etc.), polarizers, splitters, or other optical components.

Figure 6:
FIG. 6 is a flow chart of a method for manufacturing an optical waveguide as described in one or more embodiments.

FIG. 6 is a flow chart of a method 600 for manufacturing a waveguide (e.g., a nanowire optical waveguide) with a subwavelength structured coupling region in an example embodiment. Method 600 may be implemented via the techniques described with respect to FIGS. 1-5, but may be implemented via other techniques as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 600 begins at block 602 by manufacturing a first lower waveguide material. The first lower waveguide material is a cladding material can be fashioned into a wafer or other structure. In some embodiments the first lower waveguide layer is made from a material having a low index of refraction.

Method 600 then proceeds to block 604 by forming a second lower waveguide layer on the first lower waveguide material. The second lower waveguide layer is a core layer that can be manufactured on the top of the first lower waveguide layer. The core layer will initially receive photons from a signal source before they are transferred to the upper waveguide. In some embodiments, the second lower waveguide layer is made from a material having a relatively low index of refraction, e.g., a material with an index of refraction higher than the first lower waveguide layer but less than the index of refraction of the upper waveguide layers.

Proceeding next at block 606, method 600 forms a first upper waveguide layer on the second lower waveguide layer. The first upper waveguide layer is a core layer that eventually receives the photons from the second lower waveguide layer. This result is accomplished through the use of a subwavelength structured coupling region in the second lower waveguide layer. The subwavelength structured coupling region may be designed through any of the techniques described above with respect to FIGS. 1-3; however, other designs may also be used to increase the fill factor of the subwavelength structured coupling region along the direction of light propagation. In doing so, the increasing index of refraction of the first upper waveguide layer enables efficient transfer of the photons from the second lower waveguide layer. In some embodiments, the first upper waveguide layer is made of a high index of refraction material to further facilitate light transfer.

Additionally, the width of the subwavelength structured coupling region remains constant along the direction of light propagation. This increases the coupling efficiency between photons that convert between the TM-mode and TE-mode states during transfer to the first upper waveguide layer, which ultimately reduces light coupling losses as light passes through the optical waveguide. This advantage can easily be extended to optical systems utilizing the optical waveguide.

In block 608, method 600 proceeds by depositing a second upper waveguide layer on the first upper waveguide layer. In some embodiments, the second upper waveguide layer is a cladding layer made of a material having a relatively high index of refraction. For example, the second upper waveguide layer can be a material that has a higher index of refraction than the lower waveguide layers, but has a lower index of refraction than the first upper waveguide layer.

Figure 7:
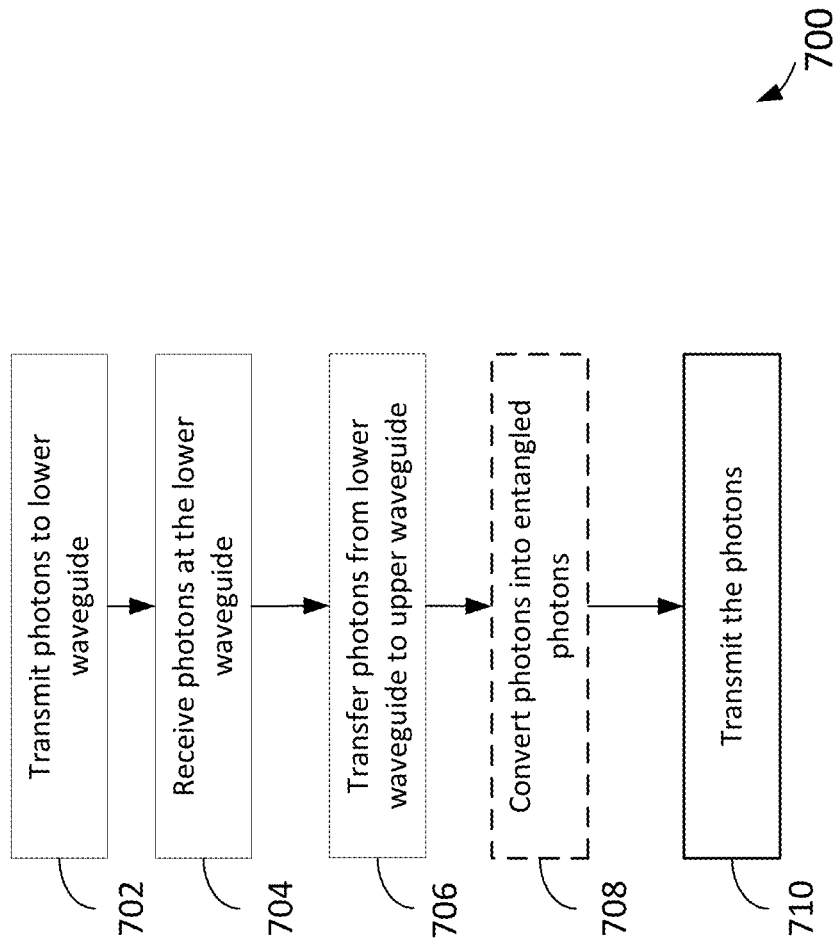
FIG. 7 is a flow chart of a method for operating an optical waveguide configured to process light as described in one or more embodiments.

FIG. 7 is a flow chart of a method for operating an integrated photonics device. Method 700 may be implemented by the techniques described above with respect to FIGS. 1-6 but may be implemented by other means as well.

Method 700 begins at block 702 by transmitting photons of an optical signal to an optical waveguide, e.g., a nanowire waveguide. The optical waveguide includes a lower and upper waveguide that is further separated each by an upper and lower layer. The optical signal may be a light beam transmitted by a laser or other light source. At block 704, the photons are received at an input of the lower waveguide, which can be received either through coupling waveguides or free-space optics.

Next, at block 706, method 700 proceeds by transferring photons from the lower waveguide to the upper waveguide. The photons can occupy a TM-mode or TE-mode polarization state.

In optional block 708, the photons are converted from one polarization state to another, for example from a TE-mode to a TM-mode or vise-versa. Method 700 then proceeds to block 710 by transmitting the photons. For example, in an embodiment the converted photons are transmitted to signal emission optics, which are configured to transmit the photons in free space. The photons may be transmitted to a receiving detector located remotely from the signal emission optics.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device.

Generally, a processor will receive instructions and data from a read-only memory and/or a random-access memory. Storage devices suitable for tangibly embodying computer program instructions and data include all forma of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed ASICs.

EXAMPLE EMBODIMENTS

Example 1 includes an optical waveguide, comprising: a lower waveguide, comprising: a first lower waveguide layer, a second lower waveguide layer coupled to the first lower waveguide layer, the second lower waveguide layer configured to receive photons from an optical signal; and an upper waveguide, comprising: a first upper waveguide layer, the first upper waveguide layer configured to receive the photons from the second lower waveguide layer, and a second upper waveguide layer coupled to the first upper waveguide layer; wherein the first upper waveguide layer includes a subwavelength structured coupling region having a fill factor that increases in a direction of light propagation, wherein a width of the subwavelength structured coupling region remains constant in the direction of light propagation.

Example 2 includes the optical waveguide of Example 1, wherein the optical waveguide comprises a nanowire waveguide.

Example 3 includes the optical waveguide of any of Examples 1-2, wherein the first lower waveguide layer comprises a material having a lower index of refraction than the second lower waveguide layer, and wherein the second lower waveguide layer comprises a material having a lower index of refraction than the first upper waveguide layer.

Example 4 includes the optical waveguide of any of Examples 1-3, wherein the subwavelength structured coupling region comprises a plurality of grating segments, and wherein the fill factor is increased by increasing a length of the plurality of grating segments in the direction of light propagation.

Example 5 includes the optical waveguide of any of Examples 1-4, wherein the subwavelength structured coupling region comprises a plurality of grating segments, and wherein the fill factor is increased by increasing a spatial area distribution of the plurality of grating segments in the direction of light propagation.

Example 6 includes the optical waveguide of any of Examples 1-5, wherein the fill factor of the subwavelength structured coupling region increases linearly with respect to a length of the optical waveguide.

Example 7 includes the optical waveguide of any of Examples 1-6, wherein the optical waveguide is configured to convert the photons from a transverse magnetic (TM) mode to a transverse electric (TE) mode or from a TE mode to a TM mode.

Example 8 includes an optical system, comprising: a signal source, wherein the signal source is configured to transmit an optical signal; a first photonics circuit coupled to the signal source and configured to receive the optical signal; an optical waveguide coupled to the first photonics circuit, wherein the optical waveguide comprises: a lower waveguide, comprising: a first lower waveguide layer, a second lower waveguide layer coupled to the first lower waveguide layer, the second lower waveguide layer configured to receive photons from the optical signal, and an upper waveguide, comprising: a first upper waveguide layer, the first upper waveguide layer configured to receive the photons from the second lower waveguide layer, and a second upper waveguide layer coupled to the first upper waveguide layer; and signal emission optics coupled to the optical waveguide, the signal emission optics configured to transmit the photons outward from the optical system, wherein the first upper waveguide layer includes a subwavelength structured coupling region having a fill factor that increases in a direction of light propagation, wherein a width of the subwavelength structured coupling region remains constant in the direction of light propagation.

Example 9 includes the optical system of Example 8, wherein the optical system is an integrated photonics system implemented on an integrated photonics chip.

Example 10 includes the optical system of any of Examples 8-9, wherein the optical waveguide comprises a nanowire waveguide.

Example 11 includes the optical system of any of Examples 8-10, further comprising a second photonics circuit coupled to the optical waveguide and the signal emission optics, the second photonics circuit configured to receive the photons from the optical waveguide and transmit the photons to the signal emission optics.

Example 12 includes the optical system of any of Examples 8-11, wherein the first lower waveguide layer comprises a material having a lower index of refraction than the second lower waveguide layer, and wherein the second lower waveguide layer comprises a material having a lower index of refraction than the first upper waveguide layer.

Example 13 includes the optical system of any of Examples 8-12, wherein the subwavelength structured coupling region comprises a plurality of grating segments, and wherein the fill factor is increased by increasing a length of the plurality of grating segments in the direction of light propagation.

Example 14 includes the optical system of any of Examples 8-13, wherein the subwavelength structured coupling region comprises a plurality of grating segments, and wherein the fill factor is increased by increasing a spatial area distribution of the plurality of grating segments in the direction of light propagation.

Example 15 includes the optical system of any of Examples 8-14, wherein the signal emission optics are configured to transmit the photons in free space to a second photonics system located remotely from the optical system.

Example 16 includes the optical system of any of Examples 8-15, wherein the fill factor of the subwavelength structured coupling region increases linearly with respect to a length of the optical waveguide.

Example 17 includes a method for manufacturing an optical waveguide, comprising: forming a first lower waveguide layer; placing a second lower waveguide layer on the first lower waveguide layer, the second lower waveguide layer configured to receive photons from an optical signal; placing a first upper waveguide layer on the second lower waveguide layer, the first upper waveguide layer configured to receive the photons from the second lower waveguide layer; and placing a second upper waveguide layer on the first upper waveguide layer, wherein the first upper waveguide layer includes a subwavelength structured coupling region having a fill factor that increases in a direction of light propagation, wherein a width of the subwavelength structured coupling region remains constant in the direction of light propagation.

Example 18 includes the method of Example 17, wherein the first lower waveguide layer comprises a material having a lower index of refraction than the second lower waveguide layer, and wherein the second lower waveguide layer comprises a material having a lower index of refraction than the first upper waveguide layer.

Example 19 includes the method of any of Examples 17-18, wherein the subwavelength structured coupling region comprises a plurality of grating segments, and wherein the fill factor is increased by increasing a length of the plurality of grating segments in the direction of light propagation.

Example 20 includes the method of any of Examples 17-19, wherein the subwavelength structured coupling region comprises a plurality of grating segments, and wherein the fill factor is increased by increasing a spatial area distribution of the plurality of grating segments in the direction of light propagation.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An optical waveguide, comprising:
   a lower waveguide including,
      a first lower waveguide layer, and
      a second lower waveguide layer coupled to the first lower waveguide layer, the second lower waveguide layer configured to receive photons from an optical signal; and
   an upper waveguide including,
      a first upper waveguide layer, the first upper waveguide layer configured to receive the photons from the second lower waveguide layer, and
      a second upper waveguide layer coupled to the first upper waveguide layer, wherein the first upper waveguide layer includes a subwavelength structured coupling region having a fill factor that increases in a direction of light propagation, further wherein a width of the subwavelength structured coupling region remains constant in the direction of light propagation,
   wherein a width of the lower waveguide and the upper waveguide are not tapered in the direction of light propagation.

2. The optical waveguide of claim 1, wherein the optical waveguide comprises a nanowire waveguide.

3. The optical waveguide of claim 1, wherein the first lower waveguide layer comprises a material having a lower index of refraction than the second lower waveguide layer, and wherein the second lower waveguide layer comprises a material having a lower index of refraction than the first upper waveguide layer.

4. The optical waveguide of claim 1, wherein the subwavelength structured coupling region comprises a plurality of grating segments, and wherein the fill factor is increased by increasing a length of the plurality of grating segments in the direction of light propagation.

5. The optical waveguide of claim 1, wherein the subwavelength structured coupling region comprises a plurality of grating segments, and wherein the fill factor is increased by increasing a spatial area distribution of the plurality of grating segments in the direction of light propagation.

6. The optical waveguide of claim 1, wherein the fill factor of the subwavelength structured coupling region increases linearly with respect to a length of the optical waveguide.

7. The optical waveguide of claim 1, wherein the optical waveguide is configured to convert the photons from a transverse magnetic (TM) mode to a transverse electric (TE) mode or from a TE mode to a TM mode.

8. An optical system, comprising:
   a signal source, wherein the signal source is configured to transmit an optical signal;
   a first photonics circuit coupled to the signal source and configured to receive the optical signal;
   an optical waveguide coupled to the first photonics circuit, wherein the optical waveguide includes,
      a lower waveguide, including,
         a first lower waveguide layer, and
         a second lower waveguide layer coupled to the first lower waveguide layer, the second lower waveguide layer configured to receive photons from the optical signal;
      an upper waveguide, including,
         a first upper waveguide layer, the first upper waveguide layer configured to receive the photons from the second lower waveguide layer, and
         a second upper waveguide layer coupled to the first upper waveguide layer, wherein the first upper waveguide layer includes a subwavelength structured coupling region having a fill factor that increases in a direction of light propagation, further wherein a width of the subwavelength structured coupling region remains constant in the direction of light propagation,
      wherein a width of the lower waveguide and the upper waveguide are not tapered in the direction of light propagation; and
   signal emission optics coupled to the optical waveguide, the signal emission optics configured to transmit the photons outward from the optical system.

9. The optical system of claim 8, wherein the optical system is an integrated photonics system implemented on an integrated photonics chip.

10. The optical system of claim 8, wherein the optical waveguide comprises a nanowire waveguide.

11. The optical system of claim 8, further comprising a second photonics circuit coupled to the optical waveguide and the signal emission optics, the second photonics circuit configured to receive the photons from the optical waveguide and transmit the photons to the signal emission optics.

12. The optical system of claim 8, wherein the first lower waveguide layer comprises a material having a lower index of refraction than the second lower waveguide layer, and wherein the second lower waveguide layer comprises a material having a lower index of refraction than the first upper waveguide layer.

13. The optical system of claim 8, wherein the subwavelength structured coupling region comprises a plurality of grating segments, and wherein the fill factor is increased by increasing a length of the plurality of grating segments in the direction of light propagation.

14. The optical system of claim 8, wherein the subwavelength structured coupling region comprises a plurality of grating segments, and wherein the fill factor is increased by increasing a spatial area distribution of the plurality of grating segments in the direction of light propagation.

15. The optical system of claim 8, wherein the signal emission optics are configured to transmit the photons in free space to a second photonics system located remotely from the optical system.

16. The optical system of claim 8, wherein the fill factor of the subwavelength structured coupling region increases linearly with respect to a length of the optical waveguide.

17. A method for manufacturing an optical waveguide, comprising:
   forming a first lower waveguide layer of a lower waveguide;
   placing a second lower waveguide layer of the lower waveguide on the first lower waveguide layer, the second lower waveguide layer configured to receive photons from an optical signal;
   placing a first upper waveguide layer of an upper waveguide on the second lower waveguide layer, the first upper waveguide layer configured to receive the photons from the second lower waveguide layer; and
   placing a second upper waveguide layer of the upper waveguide on the first upper waveguide layer, wherein the first upper waveguide layer includes a subwavelength structured coupling region having a fill factor that increases in a direction of light propagation, wherein a width of the subwavelength structured coupling region remains constant in the direction of light propagation,
   wherein a width of the lower waveguide and the upper waveguide are not tapered in the direction of light propagation.

18. The method of claim 17, wherein the first lower waveguide layer comprises a material having a lower index of refraction than the second lower waveguide layer, and wherein the second lower waveguide layer comprises a material having a lower index of refraction than the first upper waveguide layer.

19. The method of claim 17, wherein the subwavelength structured coupling region comprises a plurality of grating segments, and wherein the fill factor is increased by increasing a length of the plurality of grating segments in the direction of light propagation.

20. The method of claim 17, wherein the subwavelength structured coupling region comprises a plurality of grating segments, and wherein the fill factor is increased by increasing a spatial area distribution of the plurality of grating segments in the direction of light propagation.

* * * * *